United States Patent

Suzuki et al.

[11] Patent Number: 5,889,607
[45] Date of Patent: Mar. 30, 1999

[54] OPTICAL MODULATOR, OPTICAL SHORT PULSE GENERATING DEVICE, OPTICAL WAVEFORM SHAPING DEVICE, AND OPTICAL DEMULTIPLEXER DEVICE

[75] Inventors: Masatoshi Suzuki, Kawajima-machi; Noboru Edagawa, Higashimatsuyama; Itsuro Morita, Wako; Shu Yamamoto, Shiki; Shigeyuki Akiba, Tokyo, all of Japan

[73] Assignee: Kokusai Denshin Denwa Kabushiki Kaisha, Tokyo, Japan

[21] Appl. No.: 868,976

[22] Filed: Jun. 4, 1997

[30] Foreign Application Priority Data

Jun. 6, 1996 [JP] Japan .................................. 8-165160

[51] Int. Cl.⁶ ........................................................ G02F 1/03
[52] U.S. Cl. .......................... 359/245; 359/181; 359/250
[58] Field of Search ..................................... 359/245–248, 359/250, 264, 181–184

[56] References Cited

U.S. PATENT DOCUMENTS

5,448,579  9/1995  Chang et al. .............................. 372/6

Primary Examiner—Georgia Epps
Assistant Examiner—Dawn-Marie Bey
Attorney, Agent, or Firm—Pollock, Vande Sande & Amernick

[57] ABSTRACT

Incident light 1 is inputted to an electro-absorption-type optical modulator 4 via an optical circulator 2 and a lens 3, and subjected to intensity modulation that corresponds to a modulation signal 8. The optical signal outputted by the electro-absorption-type optical modulator 4 is inputted to a Faraday rotator 6 via a lens 5, and the plane of polarization is rotated 45°. The optical signal transmitted by the Faraday rotator 6 is totally reflected by a totally reflecting mirror 7, inputted for the second time to the Faraday rotator 6, then passed through the lens 5 after the plane of polarization has been rotated 45° by this Faraday rotator 6, and readmitted by the electro-absorption-type optical modulator 4. The output of the electro-absorption-type optical modulator 4 is emitted via the lens 3 and the optical circulator 2. The polarization dependence of insertion loss can be eliminated because the plane of polarization is rotated 90°, and the incident light 1 readmitted to the electro-absorption-type optical modulator 4 at any plane of polarization. In view of this, the polarization dependent loss of an electro-absorption-type optical modulator can be eliminated by employing such optical modulators and creating a high-performance optical short pulse generating device, optical waveform shaping device, and optical demultiplexer.

8 Claims, 7 Drawing Sheets

OPTICAL MODULATOR, OPTICAL SHORT PULSE GENERATING DEVICE, OPTICAL WAVEFORM SHAPING DEVICE, AND OPTICAL DEMULTIPLEXER DEVICE

BACKGROUND OF THE INVENTION

1. Field of the Invention

The present invention relates to an optical modulator and to an optical short pulse generating device, an optical waveform shaping device, and an optical demultiplexer device using this optical modulator.

2. Description of the Related Art

In the past, DFB (Distributed Feedback)-LDs and other single-wavelength laser diode devices were directly modulated in order to subject optical signals to digital intensity modulation, that is, to form on-off optical signals. A shortcoming of this method, however, is the broad spectrum of the generated light.

In view of this, external modulators are used in place of direct modulation for ultrahigh-speed modulation and for soliton modulation, phase modulation, and time-division multiplexing in the optical region.

Devices utilizing an electro-optical effect and devices utilizing an electro-absorption effect are used as such external modulators.

Optical modulators that utilize the electro-optical effect are devices for performing phase or intensity modulation by utilizing a phenomenon in which the index of refraction of $LiNbO_3$ or another ferroelectric crystal changes when an electric field is applied to this crystal. A known example is the Mach-Zehnder modulator.

Furthermore, devices that utilize the electro-absorption effect are devices utilizing an effect (Franz-Keldysh effect) in which the absorption-edge wavelength of a semiconductor is shifted in proportion to the square of the electric field, and InGaAsP and the like are used as the semiconductor layers in the 1.5-$\mu$m band.

Figure 6:
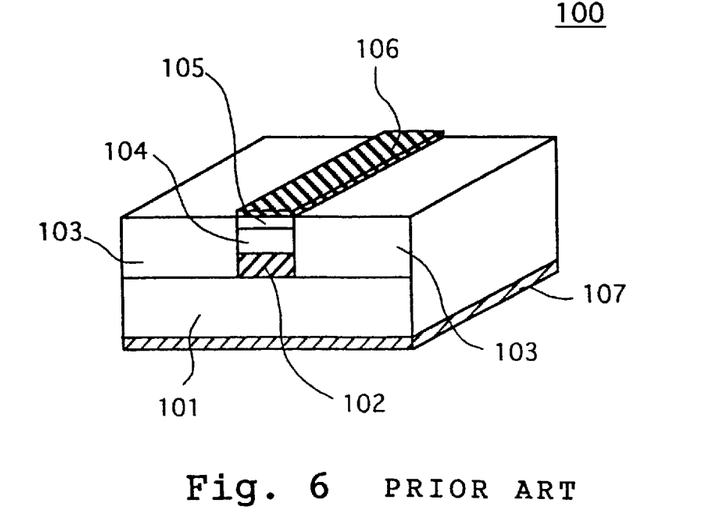
FIG. 6 is a diagram depicting the structure of a conventional electro-absorption-type optical modulator.

FIG. 6 is a diagram schematically illustrating the structure of such an electro-absorption-type optical modulator 100. In the drawing, an InGaAsP layer 102 (modulation waveguide) is formed on an n-type InP semiconductor substrate 101, semi-insulator InP 103 is positioned on both sides of the InGaAsP layer 102, and a p-type electrode 106 is provided above the InGaAsP layer 102 via a p-type InP layer 104 and a p-type InGaAsP layer 105. In addition, an n-type electrode 107 is provided underneath the n-type InP semiconductor substrate 101, and applying a modulation signal voltage between the n-type electrode 107 and the p-type electrode 106 varies the electric field applied to the InGaAsP layer 102, changes the optical absorption characteristics, and subjects incident light to optical intensity modulation.

Furthermore, the optical transmission characteristics versus the applied voltage of the electro-absorption-type optical modulator are nonlinear characteristics suitable for the direct production of the $sech^2$-type optical short pulses needed for optical soliton communications, and an optical short pulse generating device utilizing such an electro-absorption-type optical modulator has already been proposed (Japanese Laid-Open Patent Application 5-283804).

Figure 7:
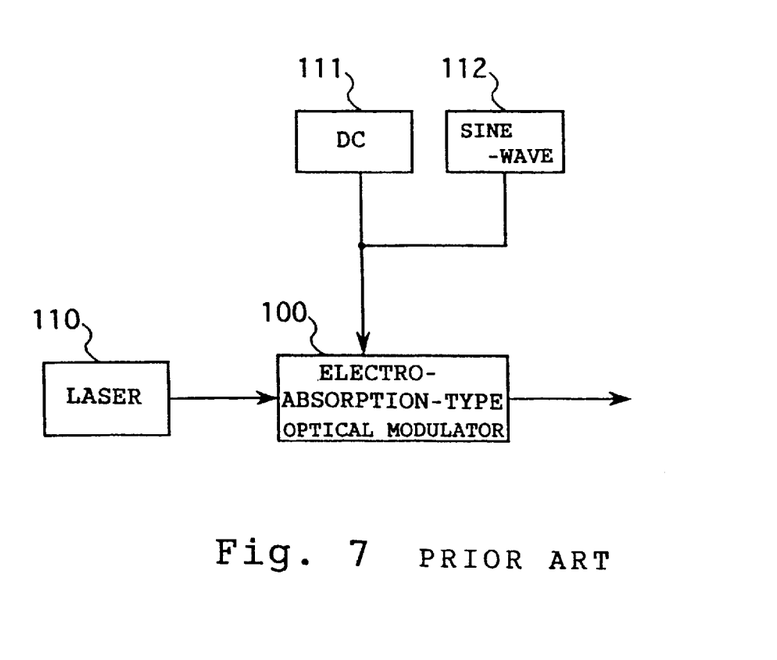
FIG. 7 is a block diagram of an optical short pulse generating device in which the conventional electro-absorption-type optical modulator is used.

FIG. 7 depicts the structure of such an optical short pulse generating device.. In the drawing, 100 is an electro-absorption-type optical modulator that has the structure described above, 110 is a DFB-LD or other semiconductor laser device for continuously generating single-wavelength light, 111 is a DC bias voltage source for supplying a constant DC bias voltage, and 112 is a sine-wave generator for producing sine-wave signals. Signals obtained by adding the output of the DC bias voltage source 111 and the output of the sine-wave generator 112 are applied as modulation signals between the p-type electrode 106 and the n-type electrode 107 of the electro-absorption-type optical modulator 100.

Figure 8:
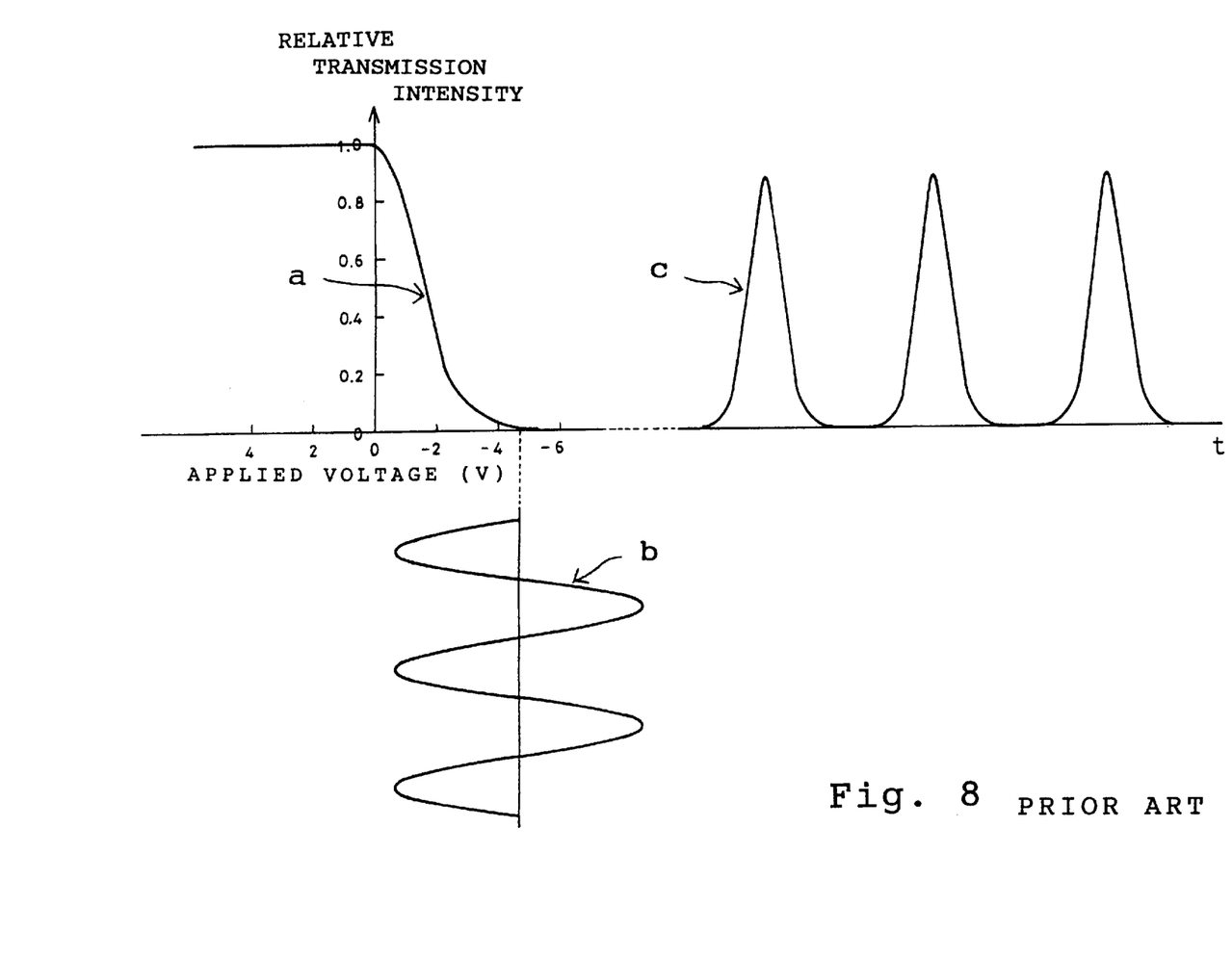
FIG. 8 is a diagram for illustrating the operation of the optical short pulse generating device in FIG. 7.

The operation of an optical pulse generating device thus configured will now be described with reference to FIG. 8. In the drawing, optical transmission characteristics versus the applied voltage of the electro-absorption-type optical modulator 100 are shown at (a) in FIG. 8. It can be seen in the drawing that transmissivity decreases as an essentially exponential function when a negative voltage is applied. The modulation voltage applied to the electro-absorption-type optical modulator 100 is shown at (b) in FIG. 8. The voltage at which the transmissivity (a) is essentially zero is produced as a bias voltage by the DC voltage source 111, and the voltage resulting from the superposition of this voltage with the sine-wave signal outputted from the sine-wave generator 112 is applied between the p-type electrode 106 and the n-type electrode 107. As a result, the optical short pulses shown at (c) in FIG. 8 are outputted from the electro-absorption-type optical modulator 100. These optical short pulses form a waveform that is very close to the soliton condition of 0.315, which is a product of the full width at half maximum of the spectrum and the full width at half maximum of the time waveform of the hyperbolic secant waveform.

It has also been proposed to use the electro-absorption-type optical modulator 100 as a 2R (Retiming/Reshaping) repeater in optical soliton transmission system and an optical demultiplexer for an optical time-division multiplexing system (Japanese Laid-Open Patent Applications 5-284117 and 7-79198).

As described above, electro-absorption-type optical modulators are used in a variety of applications, but one of the properties of such modulators is that the insertion loss has considerable polarization dependence. This dependence is the result of the rectangular cross section (for example, about 1 $\mu$m in the crosswise direction and about 0.2 $\mu$m in the longitudinal direction) of the InGaAsP layer 102, which serves as a modulation waveguide, and, depending on the plane of polarization of incident light, the insertion loss may vary by as much as about 0.5 dB. This phenomenon presents a very serious problem for a repeater in which, for example, an optical amplifier is used. Specifically, for such an optical amplification repeater system, the polarization dependent loss (PDL) must be, for example, 0.1 dB or less for the entire repeater system and 0.01 dB or less for each component. The tendency for having considerable polarization dependent loss of electro-absorption-type optical modulators therefore presents a very serious problem.

In view of the foregoing, an object of the present invention is to provide an electro-absorption-type optical modulator devoid of any polarization dependent loss.

Another object of the present invention is to provide an optical short pulse generating device, an optical waveform shaping device, and an optical demultiplexer device that involve using the electro-absorption-type optical modulator devoid of any polarization dependent loss.

SUMMARY OF THE INVENTION

Aimed at attaining the stated objects, the optical modulator of the present invention comprises an optical functional element for outputting to a second port an optical signal inputted from a first port and for outputting to a third port the optical signal inputted from the second port, an electro-absorption-type optical modulator for varying transmission characteristics in accordance with the applied voltage, a Faraday rotator for rotating by 45° the plane of polarization of inputted light, and a reflecting mirror for reflecting the inputted light, wherein the optical signal outputted from the second port of the optical functional element is directed at the reflecting mirror via the electro-absorption-type optical modulator and the Faraday rotator, and the optical signal reflected by the reflecting mirror is inputted to the second port of the optical functional element via the Faraday rotator and the electro-absorption-type optical modulator.

Furthermore, the optical short pulse generating device of the present invention inputs light outputted by a semiconductor laser, which continuously generates single-wavelength signals, to the optical modulator and applies a sine-wave voltage biased with a prescribed DC voltage.

Moreover, the optical waveform shaping device of the present invention comprises an optical splitter for halving an input optical transmission signal, the optical modulator for receiving one of the two optical signals that have been split by the optical splitter, a photodetector for receiving the other of the two optical signals that have been split by the optical splitter and for converting the signal to an electric signal, a band-pass filter for extracting, from the electric signal converted by the photodetector, a sine-wave signal synchronized with the input optical transmission signal constituting the fundamental frequency component of this electric signal, an amplifier for amplifying the output signal of the band-pass filter, a DC voltage source for outputting a DC voltage, and a phase shifter for delaying by a prescribed amount the signal obtained by adding the sine-wave voltage amplified by the amplifier and the DC voltage from the DC voltage source, and applying the result to the optical modulator.

In addition, the optical demultiplexer device of the present invention is an optical demultiplexer device for inputting time-division multiplexed optical signals obtained by shifting by a prescribed phase and adding together the optical pulse signals of a plurality of systems and for separating the inputted time-division multiplexed optical signals into the optical pulse signals of the plurality of systems, further comprising a plurality of the optical modulators for receiving the time-division multiplexed optical signals in a corresponding manner, a photodetector for receiving the time-division multiplexed optical signals and converting these signals to electric signals, a first band-pass filter for extracting, from the electric signals converted by the photodetector, sine-wave signals synchronized with the input time-division multiplexed optical signals constituting the fundamental frequency components of these electric signals, a divider for dividing, in accordance with the division ratio that corresponds to the number of sub-systems with low repetition rate before time-division multiplexing, the sine-wave signals of the fundamental frequency components outputted from the first band-pass filter, a second band-pass filter for extracting a sine-wave signal having the fundamental frequency components of the optical pulse signals from the output signal of the divider, an amplifier for amplifying the output of the second band-pass filter, and a plurality of phase shifters for delaying the output signal of the amplifier by a prescribed amount in conformity with the plurality of systems and for applying the result to the plurality of optical modulators.

Because the plane of polarization of the output light of the electro-absorption-type optical modulator is rotated 90° and the light is re-inputted to the electro-absorption-type optical modulator, the same insertion loss is incurred and the polarization dependence can be eliminated when an optical signal of any plane of polarization is inputted. In addition, the input signal is retransmitted through the modulation waveguide, and this retransmission is equivalent to using a modulation waveguide whose transmission characteristics are obtained by squaring the transmission characteristics of a single electro-absorption-type optical modulator, making it possible to produce steep optical short pulses and to speed up the operation. It is also possible to lower the voltage applied for modulation purposes.

DESCRIPTION OF THE PREFERRED EMBODIMENTS

Figure 1:
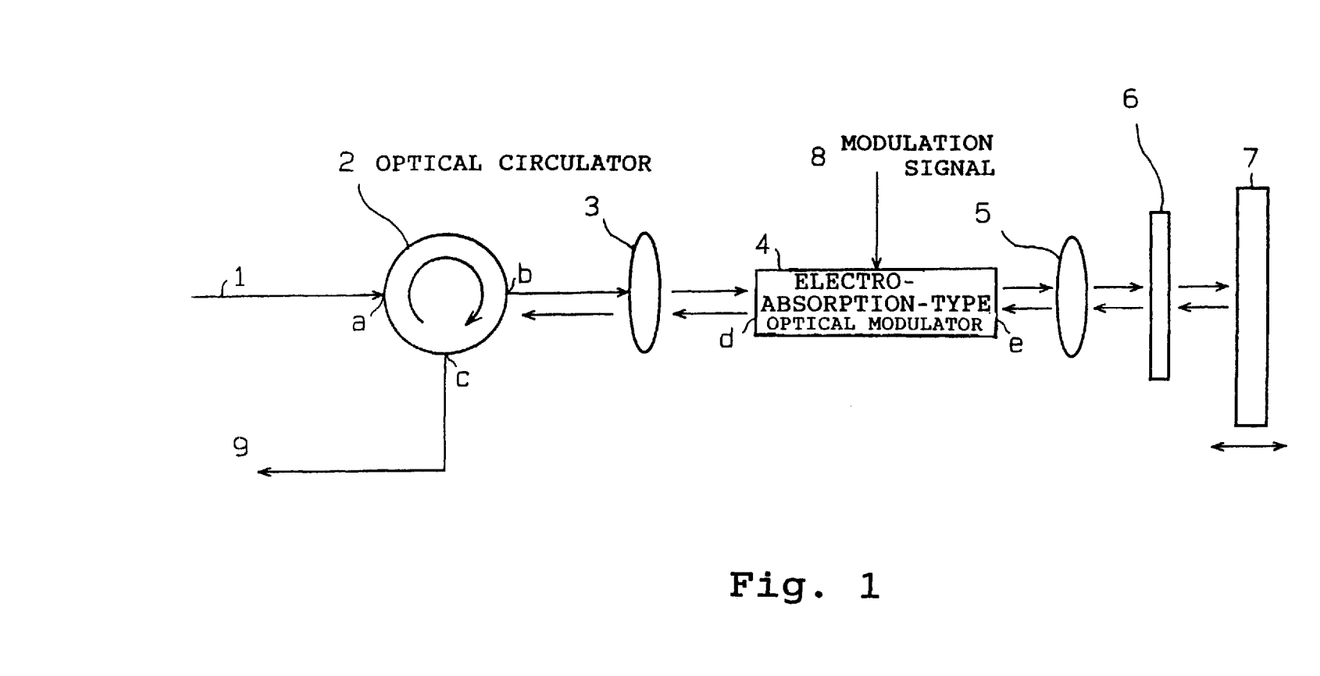
FIG. 1 is a diagram depicting the structure of the optical modulator of the present invention.

FIG. 1 depicts the structure of the optical demultiplexer of the present invention. In the drawing, incident light 1 is inputted to the port (a) of an optical circulator 2 and outputted from the port (b) of this circulator. The incident light outputted from the port (b) of the optical circulator 2 is condensed by a lens 3 and inputted to the port (d) of an electro-absorption-type optical modulator 4. A modulation signal 8 is applied to the electro-absorption-type optical modulator 4, and incident light that has undergone intensity modulation as described above in accordance with this modulation signal voltage is outputted from the port (e) of the electro-absorption-type optical modulator 4. The outputted light is collimated by a lens 5 and directed at a Faraday rotator 6, and the plane of polarization is rotated 45° as the colliminated light passes through the Faraday rotator 6. Light that has passed through the Faraday rotator 6 is totally reflected by a totally reflecting mirror 7 and redirected at the Faraday rotator 6, and the plane of polarization is again rotated 45° when this light is transmitted. Light that has passed through the Faraday rotator 6 is condensed by the lens 5 and readmitted to the electro-absorption-type optical modulator 4 through the port (e). The light readmitted through the port (e) of the electro-absorption-type optical modulator 4 is again subjected to optical intensity modulation in the electro-absorption-type optical modulator 4, inputted to the port (b) of the optical circulator 2 via the lens 3, and outputted as emitted light 9 from the port (c).

Thus, in the optical modulator of the present invention, incident light is transmitted once by the electro-absorptiontype optical modulator 4, the plane of polarization is then rotated 90°, and the light is retransmitted by the electro-absorption-type optical modulator 4. The insertion loss of the electro-absorption-type optical modulator 4 will therefore be the same for incident light having any plane of polarization, making it possible to reduce the polarization dependent loss to zero.

Because light is transmitted twice by the electro-absorption-type optical modulator 4, it is necessary to satisfy the relation $\Delta t=nT$, where $\Delta t$ is the transmission delay time between the emission of an optical signal from the port (e) of the electro-absorption-type optical modulator 4 and the readmission of the signal to the port (e), n is an integer, and T is the period of the modulation signal 8. This condition can be met by adjusting the position of the totally reflecting mirror 7, as shown by the arrow in FIG. 1.

Figure 2:
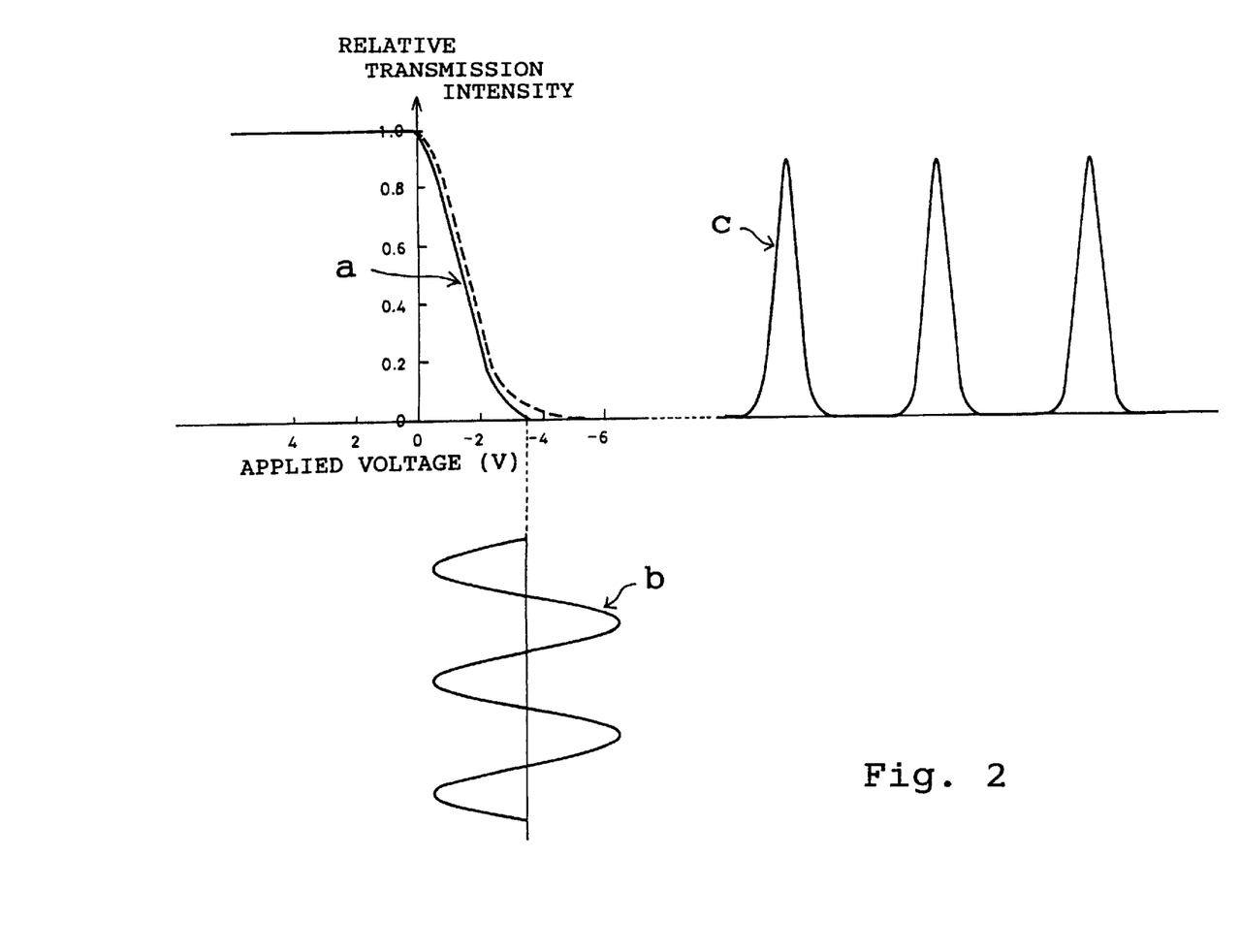
FIG. 2 is a diagram for illustrating the operation of an optical short pulse generating device in which the optical modulator of the present invention is used.

An optical short pulse generating device in which the optical modulator of the present invention is used will now be described. Such an optical short pulse generating device is used, for example, as an optical soliton source for optical soliton transmission. In FIG. 2, (a) is a diagram depicting applied voltage-optical transmission characteristics, with the solid line indicating the applied voltage-optical transmission characteristics of the electro-absorption-type optical modulator of the present invention, and the broken line indicating the applied voltage-optical transmission characteristics of the conventional electro-absorption-type optical modulator described above. As described above, incident light is transmitted twice by the electro-absorption-type optical modulator in the optical modulator of the present invention, yielding steeper characteristics than the optical transmission characteristics of a single electro-absorption-type optical modulator that are indicated by the broken line. In the proposed optical modulator with such characteristics, the optical short pulses (c) shown in FIG. 2 are outputted by the electro-absorption-type optical modulator as a result of the fact that the biased sine-wave voltage (b) shown in FIG. 2 is applied to the electro-absorption-type optical modulator 4 as a modulation voltage. These optical short pulses are steeper than the conventional optical short pulses described above.

Figure 3:
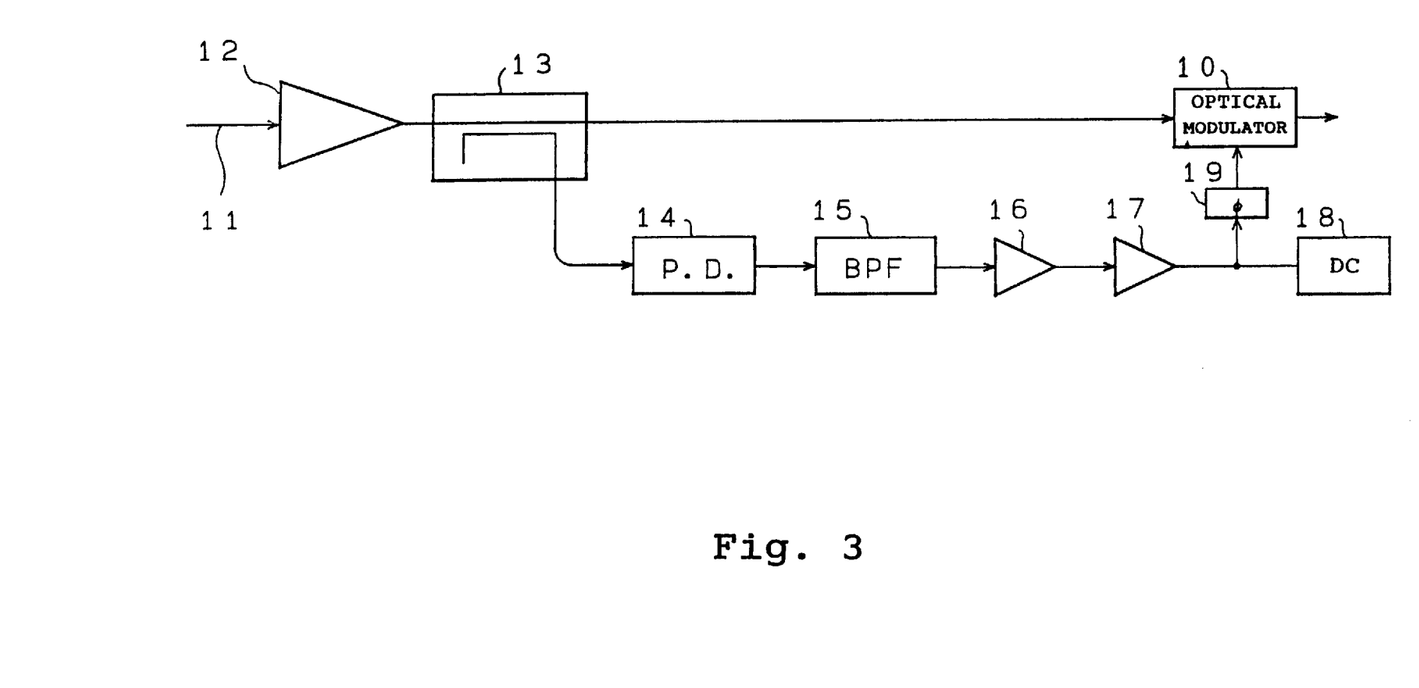
FIG. 3 is a block diagram depicting the structure of an optical waveform shaping device in which the optical modulator of the present invention is used.

An optical waveform shaping device in which the optical modulator of the present invention is used will now be described with reference to FIG. 3. This optical waveform shaping device can be used as a 2R repeater for performing retiming and waveform shaping in an optical soliton communications system. In the drawing, a transmission optical signal 11 transmitted by a long-distance optical fiber is amplified by an optical-fiber amplifier 12 or the like as needed and is halved by a 3-dB coupler 13. One of the transmitted optical signals that have been split by the coupler 13 is directed at the optical modulator 10 of the present invention described above. The other optical signal is sent to a photodetector 14 and converted to an electric signal. The electric signal is inputted to a band-pass filter (BPF) 15, only the fundamental frequency component of the transmission optical signal 11 is extracted by this filter, and the result is amplified by an amplifier 16 and adjusted to a prescribed amplitude by an amplifier 17. The sine-wave signal outputted from the amplifier 17 and the DC bias voltage outputted from a DC voltage source 18 are added together, delayed by a prescribed amount $\phi$ in such a way that the peak position of the sine wave in a phase shifter 19 functioning as a phase-shifting circuit coincides with the peak position of the transmission optical signal 11, and then applied to the optical modulator 10.

Assuming, for example, that the transmission optical signal 11 is a 20-Gb/s signal, the BPF 15 will output a sine-wave signal of 20 GHz, which is the fundamental frequency component of this BPF 15. This sine-wave signal is amplified in the amplifier 16 and is then made into a 20-GHz sine-wave signal of prescribed amplitude in the amplifier 17 used for amplitude limiting. As a result, a sine-wave signal devoid of timing jitter is outputted by the amplifier 17 even when the inputted transmission optical signal 11 contains timing jitter. In addition, the sine-wave signal outputted by the amplifier 17 is added to the DC voltage output of the DC voltage source 18, yielding the voltage depicted at (b) of FIG. 2, and this voltage is delayed by a prescribed amount in such a way that the timing conforms to that of the transmission optical signal 11 in the phase shifter 19, and is outputted to the optical modulator 10. As a result, the optical modulator 10 is modulated in such a way that the transmissivity is at a maximum during correct timing, the waveform broadening portions of the transmitted optical waveform are attenuated when the inputted transmission optical signal 11 contains timing jitter or waveform distortions, and the waveform is corrected in such a way that the center position of the waveform coincides with the correct timing position. As a result, the transmission optical signal undergoes retiming and waveform shaping.

In this embodiment, an optical-fiber amplifier 12 is inserted, but this optical-fiber amplifier 12 is not always necessary when the transmission optical signal is at a high level, and a semiconductor-based optical amplifier or the like can also be used.

The following is a description of an embodiment obtained by applying the above-described optical modulator of the present invention to an optical demultiplexer for an optical time-division multiplexing communications system. This optical time-division multiplexing communications system involves using a plurality of low bit-rate sub-systems (for example, four 10-Gb/s optical modulators) on the transmitting side (not shown), generating 10-Gb/s optical pulse signals of the systems subjected to optical intensity modulation in a corresponding manner, and phase-shifting and synthesizing the optical pulse signals of these four 10-Gb/s sub-systems in optical time domain to transmit 40-Gb/s optical time-division multiplexed signals. An optical demultiplexer device is used on the receiving side, the optical pulse signals of the four systems are separated from the received optical time-division signals, and the received signals are demodulated using corresponding 10-Gb/s optical receivers.

Figure 4:
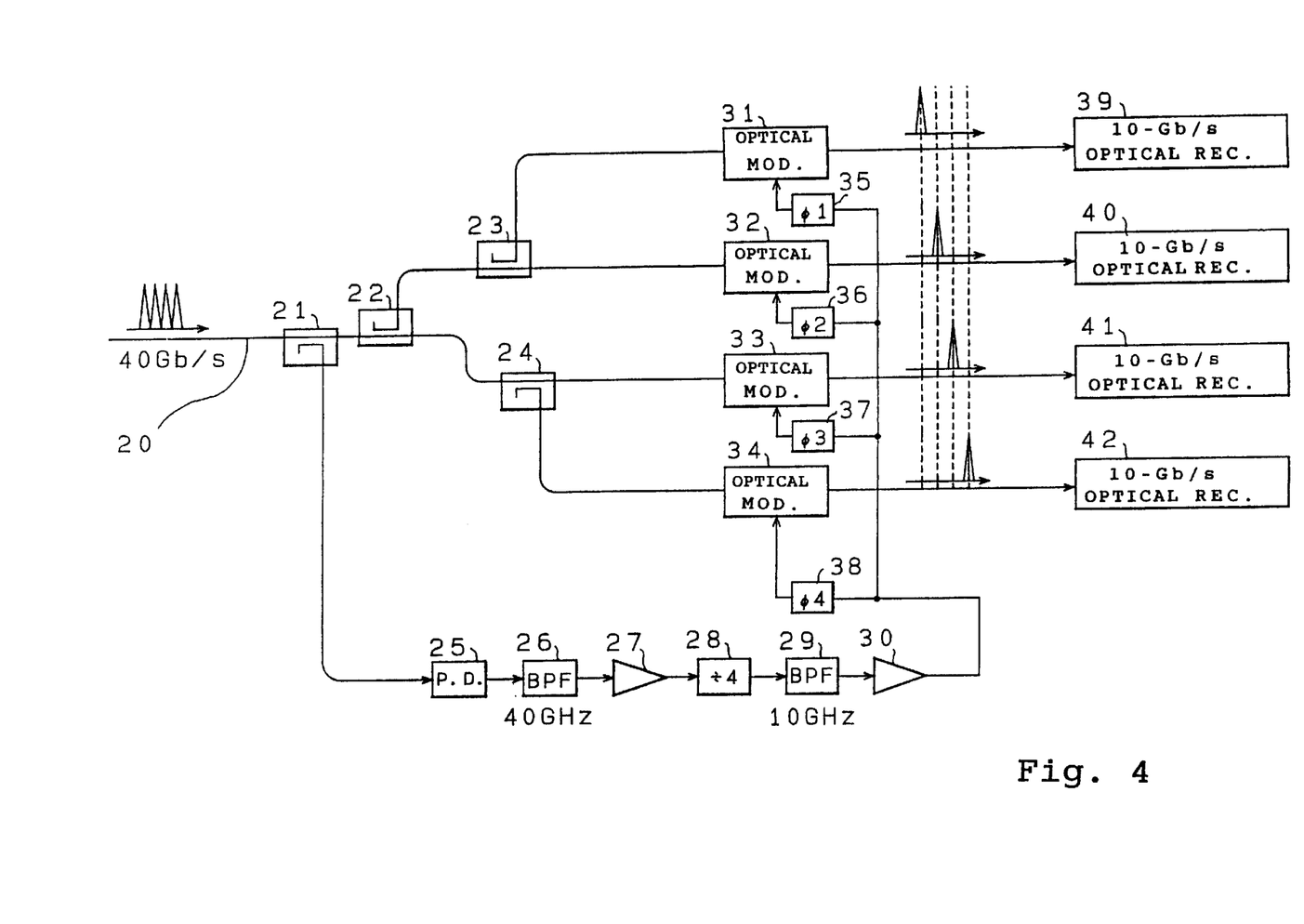
FIG. 4 is a block diagram depicting the structure of an optical demultiplexer in which the optical modulator of the present invention is used.

FIG. 4 is a block diagram depicting the structure of the optical demultiplexer device. In the drawing, for example, a 40-Gb/s transmission optical signal 20 is inputted, and a portion of this signal is split by a 3-dB coupler 21, inputted to a photodetector 25, and converted there to an electric signal. The output of the photodetector 25 is inputted to a band-pass filter 26, in which the center frequency at which the fundamental frequency of the transmission optical signal is transmitted is 40 GHz, and a 40-GHz sine-wave signal is outputted by the band-pass filter 26. This signal is amplified in the amplifier 27, and passed through a band-pass filter 29 divided in a ¼ divider 28, yielding a 10-GHz sine-wave signal. This 10-GHz sine-wave signal is converted to a signal of prescribed amplitude in an amplifier 30 and is applied to optical modulators 31, 32, 33, and 34 via the respective phase shifters 35, 36, 37, and 38, which shift the phase by a prescribed amount in each case, as shown in the drawing. Each of the optical modulators 31 through 34 has the structure described above with reference to FIG. 1 and receives the transmission optical signals that have been split by 3-dB couplers 22, 23, and 24.

Figure 5:
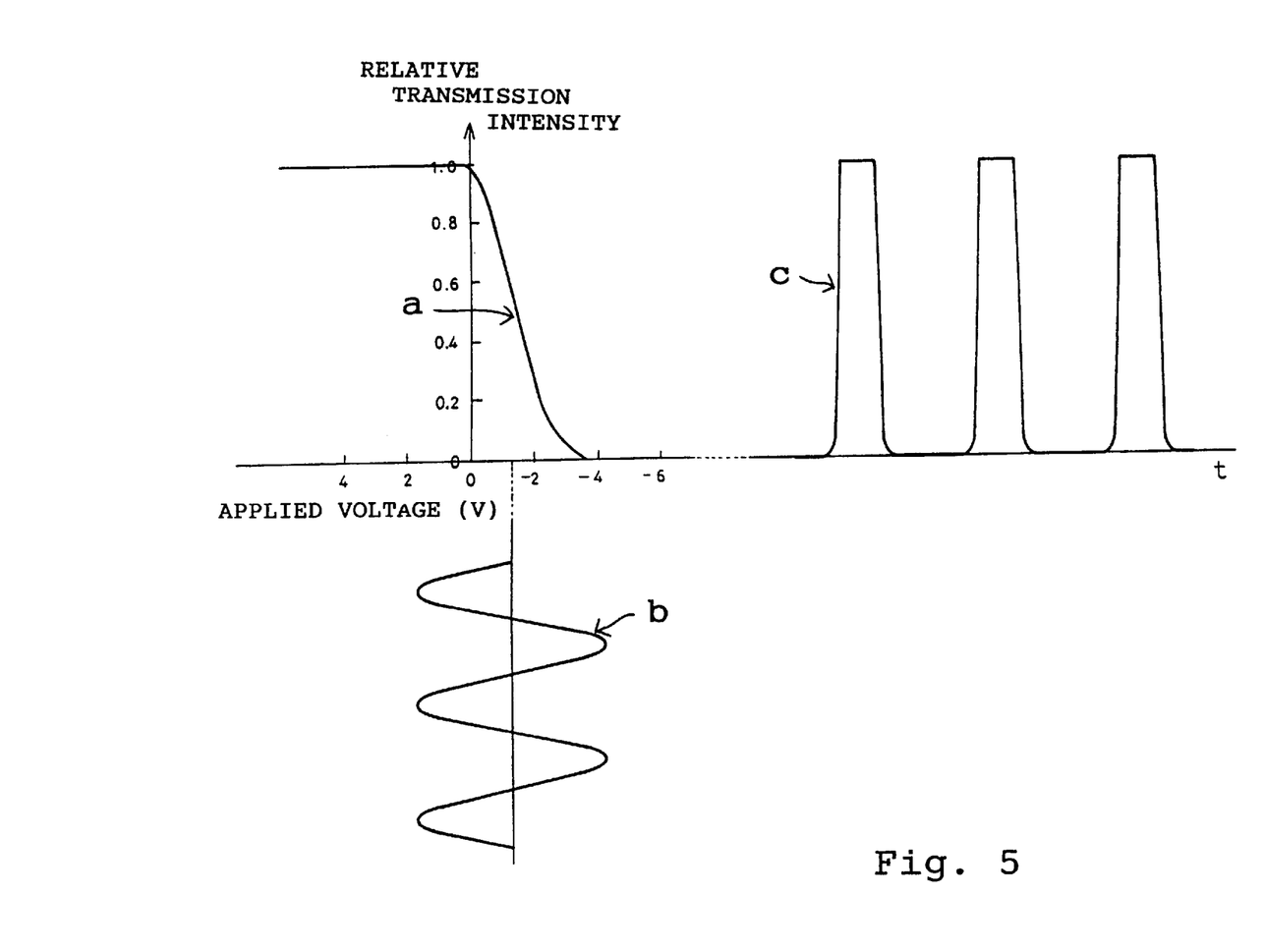
FIG. 5 is a diagram for illustrating the operation of the optical demultiplexer in FIG. 4.

The operation of the optical modulators 31 through 34 used in this embodiment will now be described with reference to FIG. 5. The applied voltage-transmission characteristics of these optical modulators are depicted at (a) of FIG. 5 and are the same as the applied voltage-transmission characteristics (a) depicted in FIG. 2 above. Applying the sine-wave voltage (b) depicted in FIG. 5 to an electro-absorption-type optical modulator having such transmission characteristics varies the transmission characteristics of the electro-absorption-type optical modulator as shown at (c) of FIG. 5. Specifically, these optical modulators operate as optical gates that periodically output optical signals.

As described above, a 40-Gb/s transmission optical signal 20 is incident on the optical modulators 31 through 34. The 10-GHz sine-wave signal outputted by the amplifier 30 is applied to the electro-absorption-type optical modulators 31 through 34 via the phase shifters 35 through 38, which shift the phase by the prescribed amounts φ1 through φ4, respectively. Consequently, the optical modulators 31 through 34 operate as optical gates, as shown in FIG. 5, and sample the inputted transmission optical signal 20 in accordance with a prescribed timing. As a result, the inputted 40-Gb/s optical signal is separated into the 10-Gb/s optical pulse signals of four systems, inputted to respective 10-Gb/s optical receivers 39 through 42, and demodulated.

Because the optical demultiplexer of the present invention is composed of the optical modulators of the present invention used as optical gates in the manner described above, it is possible to obtain optical gates that have steeper characteristics than those of conventional optical demultiplexers and to demultiplex high-speed optical signals.

Because it is structured as described above, the optical modulators of the present invention make it possible to eliminate the polarization dependent loss of electro-absorption-type optical modulators.

In addition, the proposed optical short pulse generating device that involves using these optical modulators makes it possible to generate optical pulses with narrower pulse widths. It is also possible to generate optical pulses that have the same pulse width as in the past at a lower voltage than in the past.

Furthermore, the optical waveform shaping device of the present invention eliminates the timing jitter of transmission optical signals and makes it possible to shape soliton waveforms.

The optical demultiplexer of the present invention also makes it possible to obtain a faster-operating optical demultiplexer in an optical time-division multiplexing communications system.

What is claimed is:

1. An optical modulator, comprising:

an optical functional element having a first port, a second port and a third port, said optical functional element outputting to said second port an optical signal inputted from said first port and outputting to said third port the optical signal inputted from said second port;

an electro-absorption-type optical modulator for varying transmission characteristics in accordance with an applied voltage;

a Faraday rotator for rotating by 45° the plane of polarization of inputted light; and a reflecting mirror for reflecting the inputted light, wherein the optical signal outputted from said second port of said optical functional element is directed at the reflecting mirror via said electro-absorption-type optical modulator and said Faraday rotator, and the optical signal reflected by the reflecting mirror is inputted to said second port of said optical functional element via said Faraday rotator and said electro-absorption-type optical modulator.

2. An optical modulator as defined in claim 1, wherein said optical functional element is an optical circulator.

3. An optical short pulse generating device, wherein single-wavelength continuous light is inputted to an optical modulator as defined in claim 1, and a sine-wave voltage biased with a prescribed DC voltage is applied.

4. An optical short pulse generating device wherein single-wavelength continuous light is inputted to an optical modulator, as defined in claim 2 and a sine-wave voltage biased with a prescribed DC voltage is applied.

5. An optical waveform shaping device, comprising:

an optical splitter for halving an input optical transmission signal;

an optical modulator, as defined in claim 1, for receiving one of the two optical signals that have been split by said optical splitter;

a photodetector for receiving the other of the two optical signals that have been split by said optical splitter, and converting the optical signal to an electric signal;

a band-pass filter for extracting, from the electric signal converted by said photodetector, a sine-wave signal synchronized with said input optical transmission signal, which is the fundamental frequency component of said electric signal;

an amplifier for amplifying the output signal of said band-pass filter;

a DC voltage source for outputting a DC voltage; and a phase shifter for delaying by a prescribed amount the signal obtained by adding the sine-wave voltage amplified by said amplifier and the DC voltage from said DC voltage source, and applying the result to said optical modulator.

6. An optical waveform shaping device, comprising:

an optical splitter for halving an input optical transmission signal;

an optical modulator, as defined in claim 2, for receiving one of the two optical signals that have been split by said optical splitter;

a photodetector for receiving the other of the two optical signals that have been split by said optical splitter, and converting the optical signal to an electric signal;

a band-pass filter for extracting, from the electric signal converted by said photodetector, a sine-wave signal synchronized with said input optical transmission signal, which is the fundamental frequency component of said electric signal;

an amplifier for amplifying the output signal of said band-pass filter;

a DC voltage source for outputting a DC voltage;

and a phase shifter for delaying by a prescribed amount the signal obtained by adding the sine-wave voltage amplified by said amplifier and the DC voltage from said DC voltage source, and applying the result to said optical modulator.

7. An optical demultiplexer device, comprising:

means for inputting optical time-division multiplexed signals obtained by shifting by a prescribed phase and adding together the optical pulse signals of a plurality of systems;

means for separating said inputted optical time-division multiplexed signals into the optical pulse signals of said plurality of systems;

a plurality of optical modulators, as defined in claim 1, for receiving said optical time-division multiplexed signals in a corresponding manner;

a photodetector for receiving said optical time-division multiplexed signals and converting these signals to electric signals;

a first band-pass filter for extracting, from the electric signals converted by said photodetector, sine-wave signals synchronized with said input optical time-division multiplexed signals, which are the fundamental frequency components of these electric signals;

a divider for dividing, in accordance with a division ratio that corresponds to the number of said systems, the sine-wave signals of the fundamental frequency components outputted from said first band-pass filter;

a second band-pass filter for extracting a sine-wave signal having the fundamental frequency components of said optical pulse signals from the output signal of said divider;

an amplifier for amplifying the output of said second band-pass filter; and a plurality of phase shifters for delaying the output signal of said amplifier by a prescribed amount and applying these electric signals to said plurality of optical modulators.

8. An optical demultiplexer device, comprising:

means for inputting optical time-division multiplexed signals obtained by shifting by a prescribed phase and adding together the optical pulse signals of a plurality of systems;

means for separating said inputted optical time-division multiplexed signals into the optical pulse signals of said plurality of systems;

a plurality of optical modulators, as defined in claim 2, for receiving said optical time-division multiplexed signals in a corresponding manner;

a photodetector for receiving said optical time-division multiplexed signals and converting these signals to electric signals;

a first band-pass filter for extracting, from the electric signals converted by said photodetector, sine-wave signals synchronized with said input optical time-division multiplexed signals, which are the fundamental frequency components of these electric signals;

a divider for dividing, in accordance with a division ratio that corresponds to the number of said systems, the sine-wave signals of the fundamental frequency components outputted from said first band-pass filter;

a second band-pass filter for extracting a sine-wave signal having the fundamental frequency components of said optical pulse signals from the output signal of said divider;

an amplifier for amplifying the output of said second band-pass filter; and a plurality of phase shifters for delaying the output signal of said amplifier by a prescribed amount and applying these electric signals to said plurality of optical modulators.

* * * * *